United States Patent

Suzuki et al.

(10) Patent No.: US 8,368,822 B2
(45) Date of Patent: Feb. 5, 2013

(54) DISPLAY APPARATUS FOR DISPLAYING AN IMAGE

(75) Inventors: Yasuhiko Suzuki, Fujisawa (JP); Katsumi Yamaguchi, Yokohama (JP); Nobuyuki Kaku, Oiso (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 12/243,068

(22) Filed: Oct. 1, 2008

(65) Prior Publication Data

US 2009/0225240 A1 Sep. 10, 2009

(30) Foreign Application Priority Data

Mar. 10, 2008 (JP) ................................. 2008-059443

(51) Int. Cl.
*H04N 5/64* (2006.01)

(52) U.S. Cl. ........................................ 348/836; 361/692

(58) Field of Classification Search .......... 348/836–843, 348/E5.128; 345/87; 349/58–60, 65, 94; 361/679.48, 679.5, 679.51, 692, 694, 695; 312/7.2, 223.1, 223.2, 236

See application file for complete search history.

(56) References Cited

U.S. PATENT DOCUMENTS

| 6,104,451 | A * | 8/2000 | Matsuoka et al. | 349/58 |
|---|---|---|---|---|
| 6,870,582 | B2 * | 3/2005 | Hayashimoto et al. | 349/58 |
| 2002/0043607 | A1 | 4/2002 | Tajima et al. | |
| 2005/0236548 | A1 * | 10/2005 | Maruta | 248/476 |
| 2005/0243106 | A1 * | 11/2005 | Bae et al. | 345/679 |
| 2005/0248694 | A1 | 11/2005 | Nakayama | |
| 2005/0286228 | A1 | 12/2005 | Kim | |
| 2006/0012962 | A1 * | 1/2006 | Obata | 361/704 |
| 2006/0098398 | A1 | 5/2006 | Kim | |
| 2006/0158851 | A1 | 7/2006 | Bae | |
| 2006/0207434 | A1 | 9/2006 | Takeda | |
| 2006/0244875 | A1 * | 11/2006 | Ahn | 349/58 |
| 2006/0291153 | A1 * | 12/2006 | Bae | 361/681 |
| 2007/0053144 | A1 | 3/2007 | Nakatani | |
| 2007/0146558 | A1 | 6/2007 | Urisu | |
| 2007/0216702 | A1 | 9/2007 | Takahashi et al. | |
| 2009/0135577 | A1 * | 5/2009 | Jeong | 361/816 |

FOREIGN PATENT DOCUMENTS

| EP | 1 777 955 | 4/2007 |
|---|---|---|
| EP | 1 909 159 | 4/2008 |
| JP | 11-109879 | 4/1999 |

(Continued)

OTHER PUBLICATIONS

Office Action issued in Japanese Patent Application No. 2008-059443 on Apr. 24, 2012.

*Primary Examiner* — Basil Katcheves
*Assistant Examiner* — Theodore Adamos
(74) *Attorney, Agent, or Firm* — Antonelli, Terry, Stout & Kraus, LLP.

(57) ABSTRACT

To provide an image display apparatus that is allowed to incorporate a panel module with excellent mechanical strength even if a screen is upsized and the apparatus is slimmed down. Strengthening units are mounted along a horizontal direction on canopies provided on an upper portion and a lower portion of a panel module constituting a display unit of a large-size, thin image display apparatus. Also, supporting members are mounted on the upper and lower strengthening units in such a manner that the supporting members bridge between the upper and lower strengthening units, so that a stand, or a chain or a string to be used when hanging the image display apparatus is mountable to the supporting members. This prevents direct application of external force to the panel module.

10 Claims, 9 Drawing Sheets

FOREIGN PATENT DOCUMENTS

| | | |
|---|---|---|
| JP | 2001-100650 | 4/2001 |
| JP | 2004-021104 | 1/2004 |
| JP | 2004-151305 | 5/2004 |
| JP | 2006-308825 | 11/2006 |
| JP | 2007-159048 | 6/2007 |
| KR | 10-2007-0120985 | * 11/2007 |

* cited by examiner

DISPLAY APPARATUS FOR DISPLAYING AN IMAGE

BACKGROUND OF THE INVENTION (1) Field of the Invention

The present invention relates to an image display apparatus using a flat panel display (FDP) such as a liquid crystal display (LCD) or a plasma display panel (PDP). In particular, the invention relates to a supporting or strengthening structure of a panel module using an FDP.

(2) Description of the Related Art

As television programs are broadcast digitally and with higher resolutions in recent years, there has been required a large-size (large screen), thin image display apparatus for, as a television set, receiving a broadcast or rebroadcast television program using an external or built-in tuner and displaying the received television program. As such large-size, thin image display apparatuses, ones using an FPD such as a LCD, a PDP, or an organic electro-luminescence (OEL) panel, as well as conventional projection display apparatuses have come on the market. Various supporting structures of such large-size, thin image display apparatuses, including appearance structures of the apparatuses, have been disclosed, for example, in Unexamined Japanese Patent Application Publications Nos. 2007-159048, 2004-151305, 2004-21104, 2001-100650, and 11-109879.

In general, when manufacturing such a large-size (e.g., 40 inches or more), thin (e.g., a thickness of 5 cm or less) image display apparatus, for example, when manufacturing an image display apparatus using an LCD as a display, a cabinet (including a frame and a back plate) taking a predetermined shape as well as a panel module integrally including the large-size LCD, a reflection plate, and a backlight unit is prepared. Then, a power supply substrate for supplying desired power to the apparatus, a drive circuit substrate for driving the display according to various input signals (video signals), and the like as well as the panel module are incorporated into the cabinet.

Various substrates such as the above-described power supply substrate and drive circuit substrate are typically mounted on the frame of the panel module or on the back surface thereof in the above-described large-size, thin image display apparatuses in terms of designability as disclosed in Unexamined Japanese Patent Application Publications Nos. 2007-159048, 2004-151305, 2004-21104, and 2001-100650, and the like. Also, as the screen size is further increased in recent years, the area of the above-described panel module has also been increased.

In general, a panel module is manufactured by disposing a backlight unit (including a light source such as a thin fluorescent tube) in a box-shaped frame (on the bottom thereof) with a small thickness and then fixing a large-size LCD to a surface of the backlight unit. The frame is typically formed of a metal plate made of iron, aluminum, or the like, and a reflection plate or a reflection sheet for reflecting light from the light source is provided on the inner surface (surface on which a light source such as a fluorescent tube is disposed) of the frame.

Incidentally, as upsizing of a screen and slimming down of an image display apparatus is required as described above, it is becoming increasingly important to secure the mechanical strength of a thin panel module with a large screen. For example, as disclosed in Unexamined Japanese Patent Application Publication No. 11-109879, a structure in which a supporting member taking a shape along diagonal lines connecting four corners of a flat panel, that is, an X-shaped supporting member is provided on the back surface of the flat panel has been proposed.

However, related-art examples, in particular, the structure in which the X-shaped supporting member is provided, shown in Unexamined Japanese Patent Application Publication No. 11-109879 have a problem with respect to slimming down of image display apparatuses and, therefore, have not necessarily been supporting structures suitable for commercialization.

In order to solve such a problem caused by an increase in the area of a panel module due to upsizing of an image display apparatus, a supporting structure and/or a strengthening structure of a panel module suitable for slimming down of an apparatus, including a mounting structure of various substrates on the back surface of the panel module, such as a power supply substrate and a drive circuit substrate, must be devised.

SUMMARY OF THE INVENTION

The present invention provides a technology for sufficiently securing the strength of an image display apparatus while slimming down the apparatus.

High heat-generating components of the image display apparatus, such as a central processor unit (CPU) and an image processing large scale integration (LSI), must be cooled by passing a large amount of air through these components. However, as slimming down of the image display apparatus proceeds as described above, the passage of air is narrowed so that these components are not sufficiently cooled. Also, the backlight of the panel module has a heat source thereof on the inner bottom of the frame; therefore, if the spaces between the back surface of the panel module and the substrates are small, the back surface and the substrates thermally influence each other. This makes it difficult to cool the high temperature components implemented on the substrates. Also, the temperature of the back surface of the panel module increases locally so that the light-emitting characteristic of the backlight unit in the liquid crystal panel is changed. This results in luminance unevenness.

Therefore, a mounting structure of the substrates on the back surface of the image display apparatus, such as the power supply substrate and drive circuit substrate, must be devised so that the high temperature components are favorably cooled while slimming down the apparatus.

That is, the present invention provides a technology for favorably cooling the high temperature components while slimming down the image display apparatus.

The present invention is characterized in that a strengthening unit extending in the horizontal direction of the panel module is provided on each of the upper and lower edges of the back surface of the panel module in the vertical direction of the panel module and that multiple supporting members extending in the horizontal direction of the panel module are mounted on the strengthening units.

In this case, a canopy may be formed on each of the upper and lower edges of the panel module in the vertical direction of the panel module, the strengthening unit may be formed so that a section thereof in the vertical direction of the panel module may be approximately U-shaped, and the strengthening unit may be fixed to the canopy unit in such a manner that the strengthening unit is inserted into the canopy unit. Also, the strengthening unit may be fixed to the canopy unit by screwing the strengthening unit inserted into the canopy unit in one of an upward direction and a downward direction of the panel module, as well as in a direction orthogonal to the display surface of the display panel.

Also, a stand mounting unit to be used when the image display apparatus is set up on the floor or a hoisting attachment mounting unit to be used when the image display apparatus is hung on a wall may be connectable to the supporting members.

Also, a circuit substrate may be mounted on the supporting members and on the back surface of the panel module.

The present invention is characterized in that the heat-generating components provided on the circuit substrate are coupled to a metal case directly or via a heat conducting member. Preferably, air is circulated through a first space between the circuit substrate and the metal case and a second space between the circuit substrate and the back surface of the panel module in such a manner that the air moves from a lower portion of the image display apparatus to an upper portion thereof. In this case, the second space is preferably larger than the first space.

Also, an opening for circulating air is preferably formed in each of an upper portion and a lower portion of a back cover for covering the back surface of the image display apparatus, and air to be circulated through the first and second spaces is preferably put in from the opening formed in the lower portion of the back cover, circulated through the first and second spaces, and then exhausted from the opening formed in the upper portion thereof. Also, air is preferably circulated through a third space between the back cover and metal case, and the third space is preferably smaller than the first space.

According to the above-described aspect of the present invention, the strength of the image display apparatus is sufficiently secured while slimming down the apparatus. Also, the high heat temperature components are favorably cooled while slimming down the apparatus.

Also, according to the aspect of the present invention, an excellent advantage is obtained in which the problem caused by an increase in the area of the panel module due to upsizing of the image display apparatus is solved, that is, in which a panel module with excellent mechanical strength is manufactured with ease and a low cost and therefore an image display apparatus suitable for upsizing or slimming down is provided.

Thus, the case is used as a heat dispersion member and the first space between the circuit and case is reduced to the minimum without increasing the first space so that cooling of the high heat temperature components (radiation of heat) is efficiently performed. On the other hand, since the second space between the back surface of the panel module and the substrates is made larger than the first space, thermal interference between the high temperature components and the backlight unit of the panel module is reduced so that a sufficient air flow is secured between the back surface of the panel module and the substrates. Thus, the high temperature components are more favorably cooled.

DESCRIPTION OF THE ILLUSTRATED EMBODIMENT

Now, an embodiment of the present invention will be described in detail with reference to the accompanying drawings. In these drawings, components having same functions are given same reference numerals and will not be repeatedly described.

Hereafter, an image display apparatus according to this embodiment using a liquid crystal display (LCD) as a large-size display will be described together with a supporting structure thereof.

Figure 1:
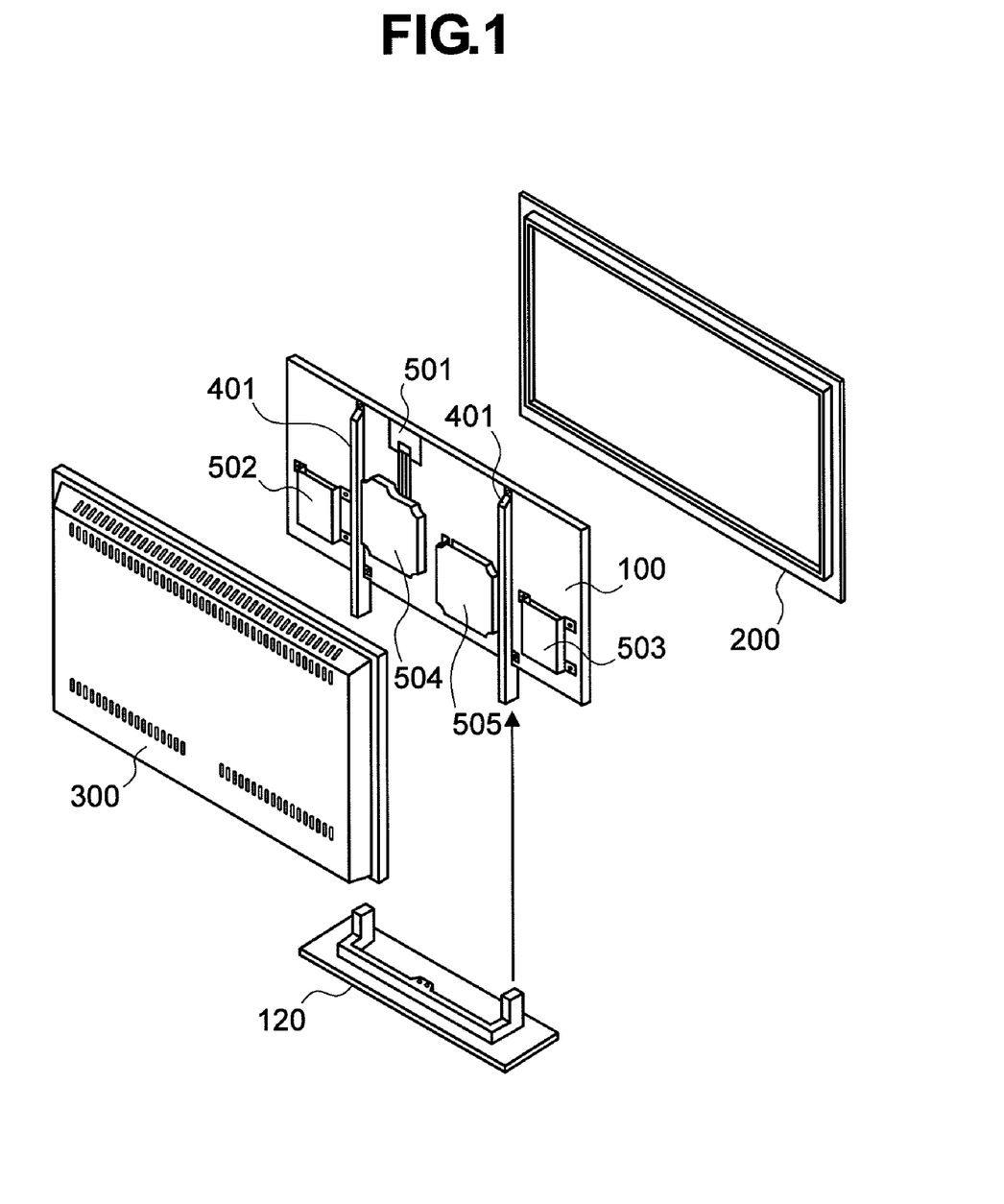
FIG. 1 is a developed perspective view showing an overall configuration of an image display apparatus according to an embodiment of the present invention.

FIG. 1 is a developed view showing an overall configuration of the image display apparatus according to this embodiment. In FIG. 1, reference numeral 100 represents an LCD as a large-size display. The LCD 100 is typically mounted on an opening of a frame obtained by forming a thin metal plate made of iron or aluminum into a box shape with a shallow bottom and a large area. Hereafter, the LCD 100 will be referred to as a panel module 100. For example, multiple fluorescent tubes or a light emitter including a light-emitting diode and the like are mounted as a light source on the bottom of the frame in order to obtain desired luminance by applying light (so-called "backlight") to the LCD taking the shape of approximately a rectangular thin plate from the back surface of the LCD. A reflection plate or a reflection sheet for reflecting light from the light source is provided on the inner surface of the frame. Various substrates (to be described later) necessary for the apparatus, such as signal substrates 501 to 504 and a power supply substrate 505, are mounted on the back surface of the panel module 100. A stand 120 for setting up the apparatus is mounted on the lower edge of the panel module 100.

An outer frame 200 typically called a bezel, for example, formed by injection-molding a synthetic resin or the like is mounted on a front surface of the panel module 100. Also, a back lid (back cover) 300, for example, formed by injection-molding a synthetic resin or the like is mounted on the back surface of the module.

Figure 2A:
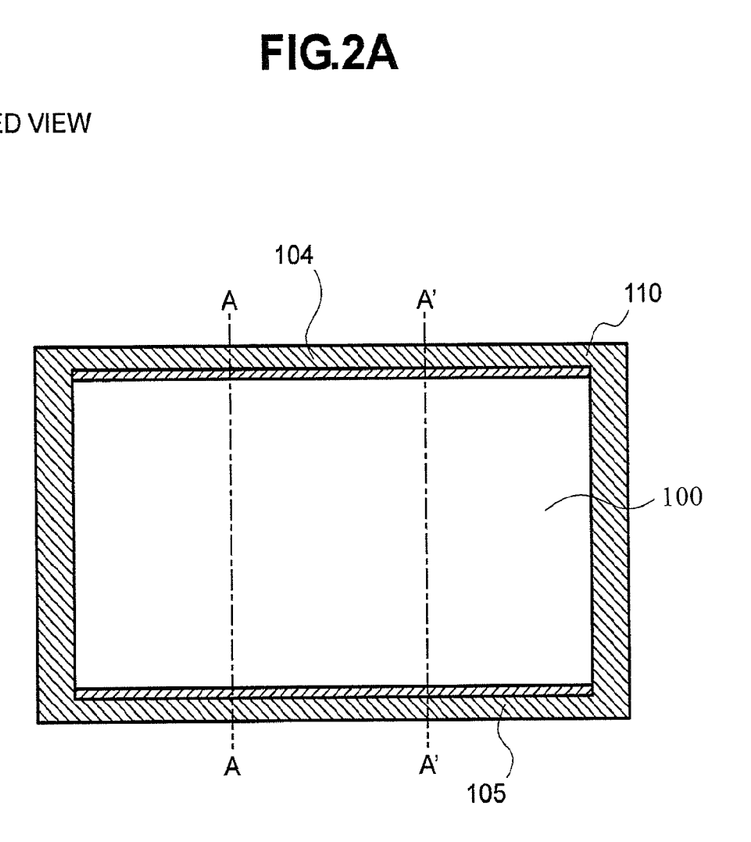
FIG. 2A is a plan view of a panel module taken out of the image display apparatus according to this embodiment at a time when the panel module is seen from the back surface thereof.
Figure 2B:
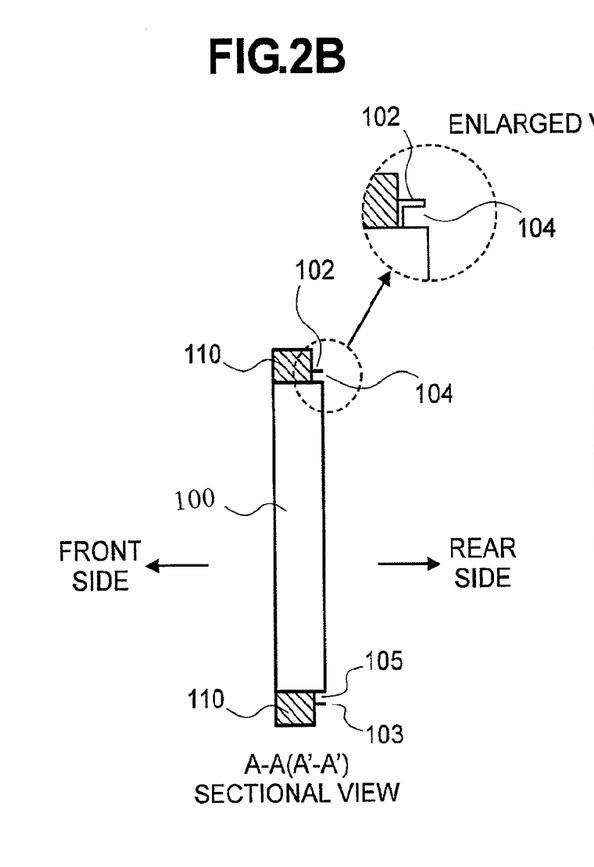
FIG. 2B is and a sectional view of the panel module.

FIG. 2A is a plan view of the panel module 100 taken out of the above-described image display apparatus at a time when the panel module is seen from the back surface thereof and FIG. 2B is a sectional view of the panel module 100.

In FIGS. 2A and 2B, the rear lid 300, stand 120, and substrates necessary for the apparatus, such as the signal substrates 501 to 504 and power supply substrate 505, have been removed from the panel module. FIG. 2A is a plan view and FIG. 2B is a sectional view taken along A-A (A'-A') of FIG. 2A.

L-shaped canopies 102 and 103 are provided along the horizontal direction above an upper portion of the panel module 100 mounted on a frame 110 and below a lower portion thereof (a drawing in which the vicinity of the canopy 102 is enlarged is shown in FIG. 2B). Therefore, in FIG. 2A, it looks as if grooves 104 and 105 were made in parallel on the upper and lower portions of the panel module 100. The canopies 102 and 103 are thin plate-shaped members made of a material (e.g., hard resin, iron plate, etc.) with rigidity and strength allowing the material to withstand the configuration to be described later.

Figure 3A:
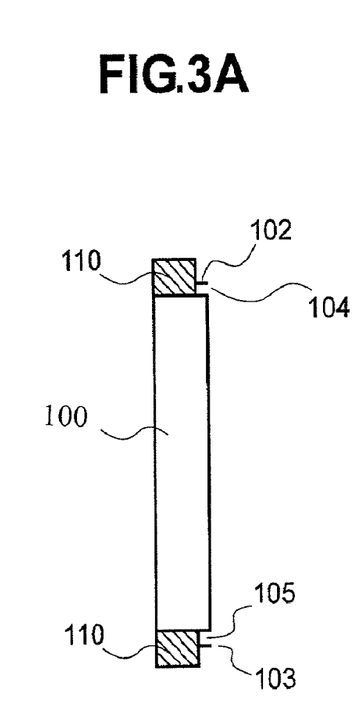
FIGS. 3A to 3D are drawings showing a strengthening unit according to this embodiment.
Figure 3B:
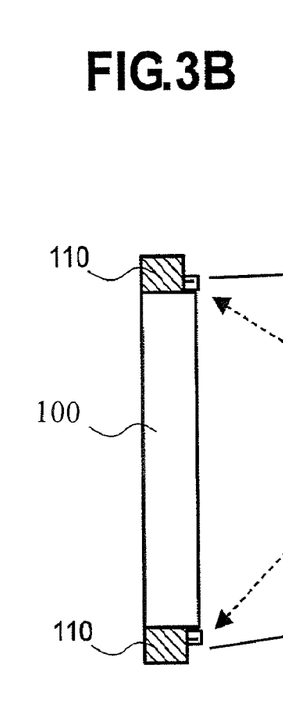

Next, strengthening units according to this embodiment will be described with reference to FIGS. 3A to 3D. FIG. 3A again shows the A-A sectional view shown in FIG. 2B. FIG. 3B is a sectional view of a configuration in which the strengthening units are mounted on FIG. 3A.

Figure 3C:
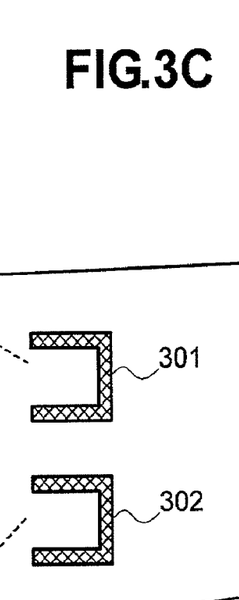
Figure 3D:
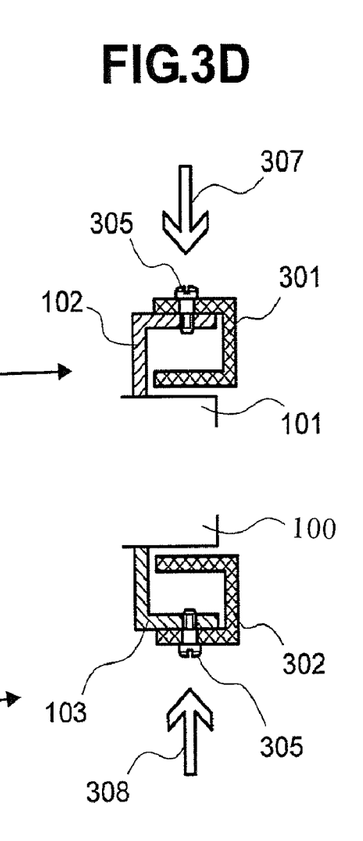

Specifically, FIG. 3B shows a sectional view of a structure in which strengthening units 301 and 302 are mounted on the two collars (canopies) 102 and 103 formed along the horizontal direction on an upper portion and a lower portion of the perimeter of the thin plate-shaped frame included in the panel module 100. FIG. 3C shows an enlarged sectional view of one of the strengthening units 301 mounted on the upper canopy 102 and an enlarged sectional view of the other strengthening unit 302 mounted on the lower canopy 103. Note that in the sectional views shown in FIG. 3C, holes used when mounting fixing screws 305 are omitted. FIG. 3D shows enlarged sectional views of portions in which the strengthening units 301 and 302 are mounted. The strengthening units 301 and 302 are thin plate-shaped members made of a material (e.g., hard resin, iron plate, etc.) with rigidity and strength allowing the material to withstand the configuration to be described later.

As is apparent from FIGS. 3C and 3D, the strengthening units 301 and 302 are formed so that these units are each U-shaped in sections thereof in the vertical direction of the panel module 100 and extend in the horizontal direction of the panel module 100. By forming the sections of the strengthening units 301 and 302 into U shapes, the mechanical strength of the strengthening units 301 and 302 themselves is improved despite the elongated shapes of these units. The strengthening units 301 and 302 are inserted into the canopies 102 and 103 formed on the upper portion and lower portion of the panel module 100. Also, as shown in FIG. 3D, the upper strengthening unit 301 is fixed to the upper surface of the upper canopy 102 using one of screws 305. As such, the lower strengthening unit 302 is fixed to the lower surface of the lower canopy 103 using one of the screws 305. As shown in FIG. 3D, the strengthening units 301 and 302 are screwed using the screws 305 in such a manner that the panel module 100 is vertically interposed between these units along the directions of arrows 307 and 308, that is, along the upward and downward directions of the panel module 100. While the strengthening units 301 and 302 are screwed to the canopies 102 and 103 in the upward and downward directions of the panel module 100 in this example, the strengthening units 301 and 302 may be screwed in a direction orthogonal to the main plane of the panel module in addition to the upward and downward directions.

While the strengthening units 301 and 302 may be fixed to positions of the canopies 102 and 103 corresponding to the A-A section or A'-A' section using the screws 305, these units are also preferably screwed in other multiple positions of the canopies 102 and 103.

The strengthening units 301 and 302 may take any shapes as long as portions thereof to be fixed using the screws 305 are U-shaped. Also, the strengthening units 301 and 302 need not take identical shapes and typically take different shapes.

Figure 4A:
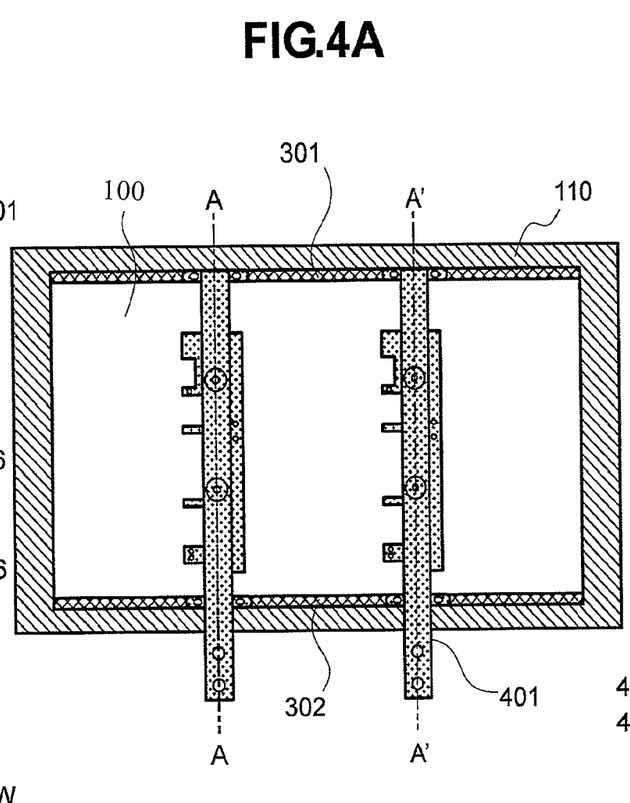
FIGS. 4A to 4C are drawings showing a supporting member according to this embodiment.
Figure 4B:
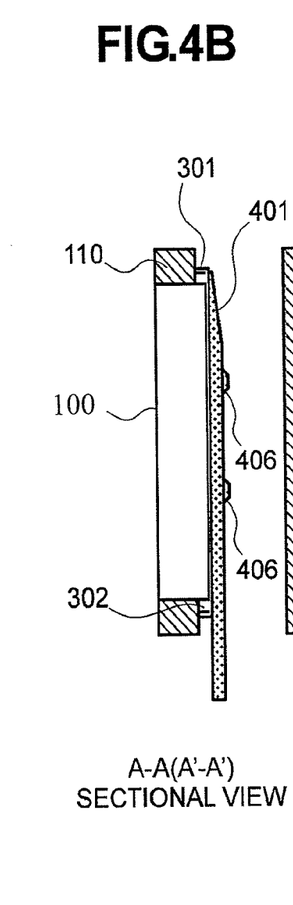
Figure 4C:
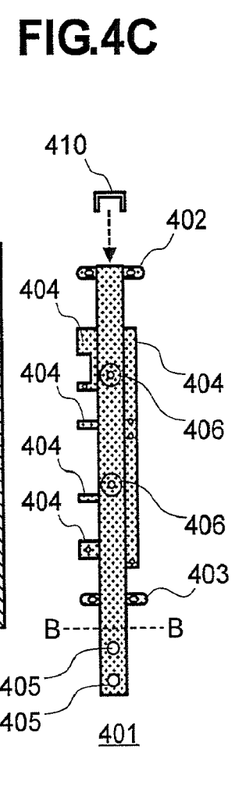

Referring now to FIGS. 4A to 4C, multiple beam-shaped supporting members according to this embodiment for fixing the strengthening units 301 and 302 in such a manner that the supporting members straddle the strengthening units 301 and 302 in the vertical direction will be described. FIGS. 4A and 4B are drawings in which supporting members 401 are mounted on FIGS. 2A and 2B. FIG. 4A is a plan view, FIG. B is a sectional view taken along A-A or A'-A' of FIG. 4A, and FIG. 4C is a plan view of one of the supporting members 401.

The two supporting members 401 are formed in such a manner that the members extend in the vertical direction of the panel module 100. The supporting members 401 are each provided with mounting units 402 and 403 corresponding to the positions of the strengthening units 301 and 302 in the panel module 100. The supporting members 401 are screwed to screw holes made in the strengthening units 301 and 302 via the mounting units 402 and 403.

As shown in a B-B section 410, the supporting members 401 are, for example, thin plate-shaped members.

In the supporting member 401, reference numeral 404 represents fittings for fixing various substrates of the image display apparatus, such as the power supply substrate and drive circuit substrate. These substrates are fixed using the supporting members 401 and fixing screw holes (not shown) made on the back surface of the panel module 100. That is, the supporting members 401 are directly fixed to the strengthening units 301 and 302 provided above the upper portion of the panel module 100 and below the lower portion thereof using fixing means such as screws and are not fixed directly to the panel module 100. Thus, as will be described later, forces applied to the supporting members 401 are not directly transmitted to the panel module 100 but to the strengthening units 301 and 302. Accordingly, the mechanical strength of the panel module 100 is improved.

Also, the supporting members 401 are provided with mounting units 405 for mounting the stand 120. The mounting units 405 are, for example, mounting screw holes. The stand 120 for floor-standing is not directly fixed to the panel module 100 itself.

Also, the supporting members 401 are provided with hoisting attachment mounting units 406 for hanging the image display apparatus on a wall or the like. Thus, when the image display apparatus is hung on a wall or the like using a chain, a rope, or the like, the chain, rope, or the like is not directly fixed to the panel module 100 itself. The hoisting attachment mounting units 406 may be connected to a fitting or the like (not shown) for wall hanging.

Figure 5:
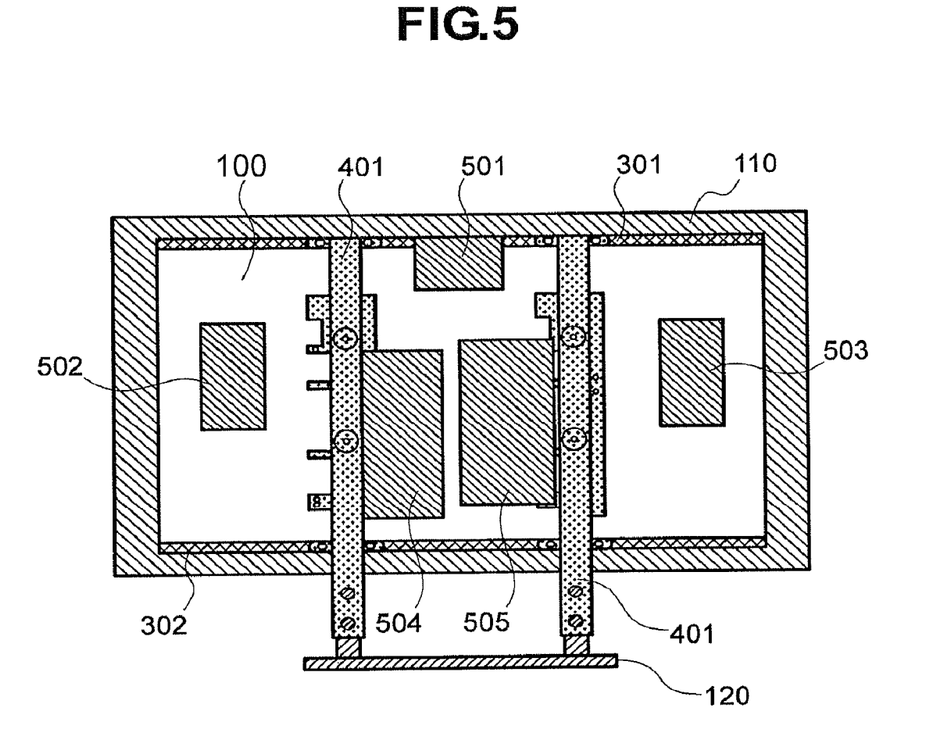
FIG. 5 is a drawing showing the back surface of the panel module according to this embodiment.

FIG. 5 is a drawing in which the substrates 501 to 506 of the image display apparatus, such as the power supply substrate and drive circuit substrate, are disposed on the panel module shown in FIG. 4A. Note that cables such as connections between these substrates are not shown.

As described above, the strengthening units 301 and 302 taking a U shape in sections thereof are mounted on the canopies (collars) 102 and 103 provided on the upper and lower portions of the perimeter of the frame 110 as a strengthening structure for securing the mechanical strength of the panel module 100 in such a manner that these strengthening units fix the panel module 100 from above and below. Thus, the mechanical strength of the panel module 100 in the horizontal (lateral) direction is secured. Also, by fixing the supporting members 401 to the strengthening units 301 and 302 mounted above and below the panel module 100, the mechanical strength of the panel module 100 in the vertical (longitudinal) direction is also secured.

Here, if the stand 120 is mounted on the supporting members 401 and the image display apparatus is set up on the floor or if a fitting for wall hanging is connected to the supporting members 401 and the image display apparatus is hung on the wall, a force caused by the tare weight of the image display apparatus is applied to the supporting members 401. At that time, the supporting members 401 are connected to the strengthening units 301 and 302 provided at the upper and lower edges of the panel module 100 as described above; therefore, the force caused by the tare weight of the image display apparatus is not directly transmitted to the panel module 100. Instead, the force is transmitted to the strengthening units 301 and 302, which have improved mechanical strength since these units are U-shaped in sections thereof. Therefore, if the image display apparatus is set up on the floor or hung on the wall, stress applied to the panel module 100 (and liquid crystal panel) is reduced. Thus, twists or distortions of the panel module 100 are reduced so that the mechanical strength of the panel module 100 is secured.

Also, the substrates of the image display apparatus, such as the power supply substrate and drive circuit substrate, are fixed to the supporting members 401 and the back surface of the panel module 100. Therefore, the stress to be transmitted from the supporting members 401 is transmitted to the panel module 100 via the strengthening units 301 and 302 serving as cushioning materials, as well as via these substrates serving as cushioning materials.

Such a strengthening structure is excellent as a strengthening structure for securing the mechanical strength of the panel module 100 and, in particular, will be advantageous as a strengthening structure of a relatively large apparatus, for example, an image display apparatus with a size of 40 inches or more.

In this embodiment, the canopies provided above and below the panel module 100 protrude taking an L shape in sections thereof. Even if the canopies do not take the shape according to this embodiment, an advantage similar to that obtained according to this embodiment is expected if the canopies are indirectly mounted to the panel module. Also, if there are no canopies, canopies may be provided so as to have a configuration similar to that according to this embodiment.

According to this embodiment, the problem caused by an increase in the area of a panel module due to upsizing of an image display apparatus is solved. Thus, a panel module with excellent mechanical strength is manufactured with ease and a low cost. Thus, an image display apparatus suitable for upsizing and/or slimming down is provided.

Figure 6:
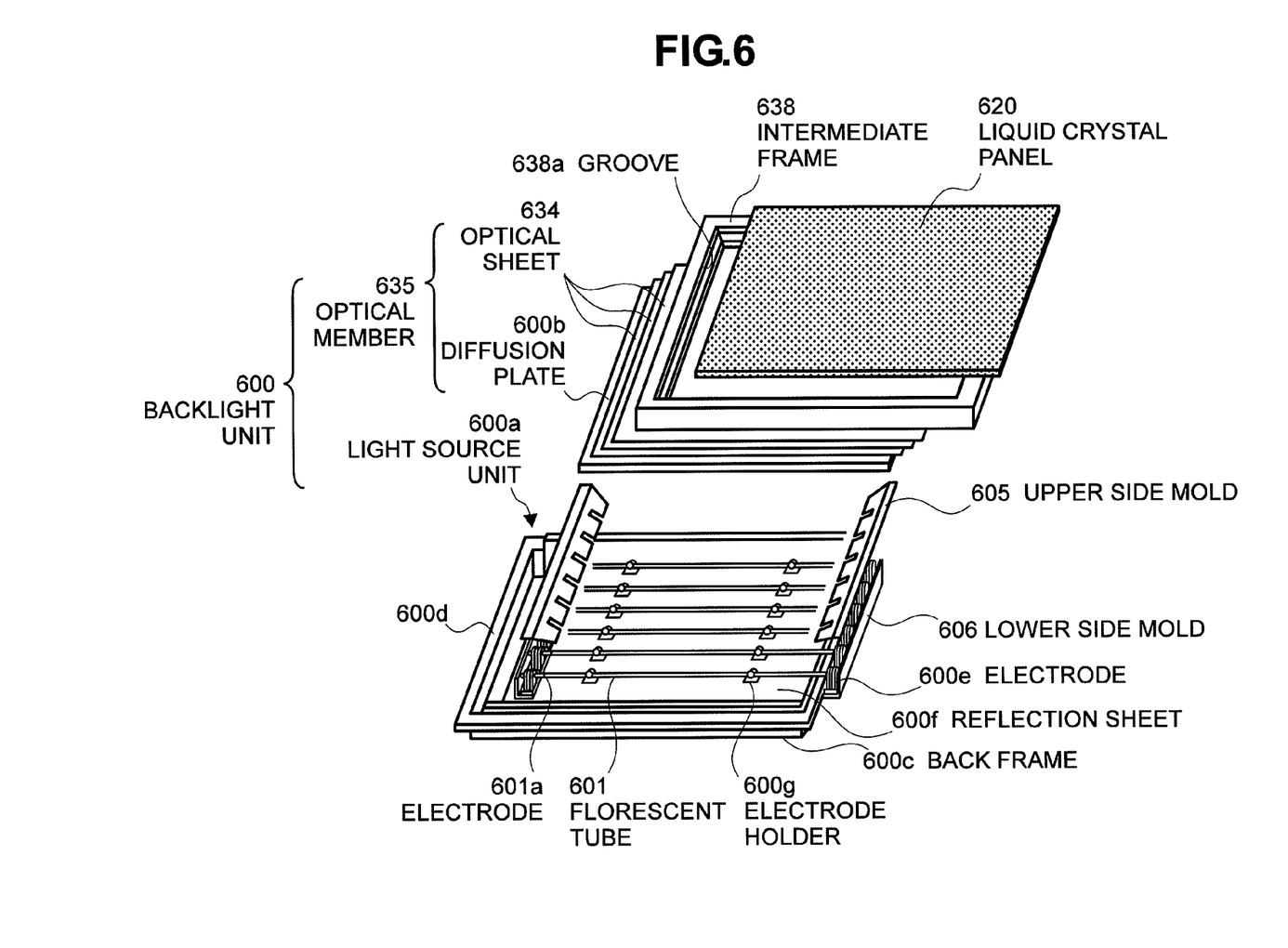
FIG. 6 is a drawing showing the inside of the panel module according to this embodiment.

FIG. 6 is a developed view showing an example of an internal configuration of the panel module 100. The panel module 100 includes a liquid crystal panel 620, an intermediate frame 638, and a backlight unit 600. The liquid crystal panel 620 is inserted into a groove 638a of the intermediate frame 638. The backlight unit 600 is mounted on a lower portion (back surface) of the intermediate frame 638.

The backlight unit 600 includes a light source unit 600a and an optical member 635. The optical member 635 includes multiple optical sheets 634 and a diffusion plate 600b. The optical sheets 634, diffusion plate 600b, and light source unit 600a are disposed sequentially from the side of the intermediate frame 638. In the optical unit 600a, a reflection sheet 600f is placed on the bottom of a box-shaped frame 600d. Also, electrodes 601a of multiple florescent tubes 601 as light sources are connected to the electrode holders 600e provided on both sides of the optical unit 600a. The florescent tubes are held by the tube holders 600g. The electrodes 601a on both sides are covered with an upper side mold 605 and a lower side mold 606.

As is understood from FIG. 6, the florescent tubes as heat sources are disposed on the bottom of the box-shaped frame 600d of the panel module, that is, in the vicinity of the back surface of the panel module. Therefore, generated heat is apt to be transmitted to the substrate disposition surface (to the back surface of the panel module) through a back frame 600c.

Figures 7A, 7B, 7C:
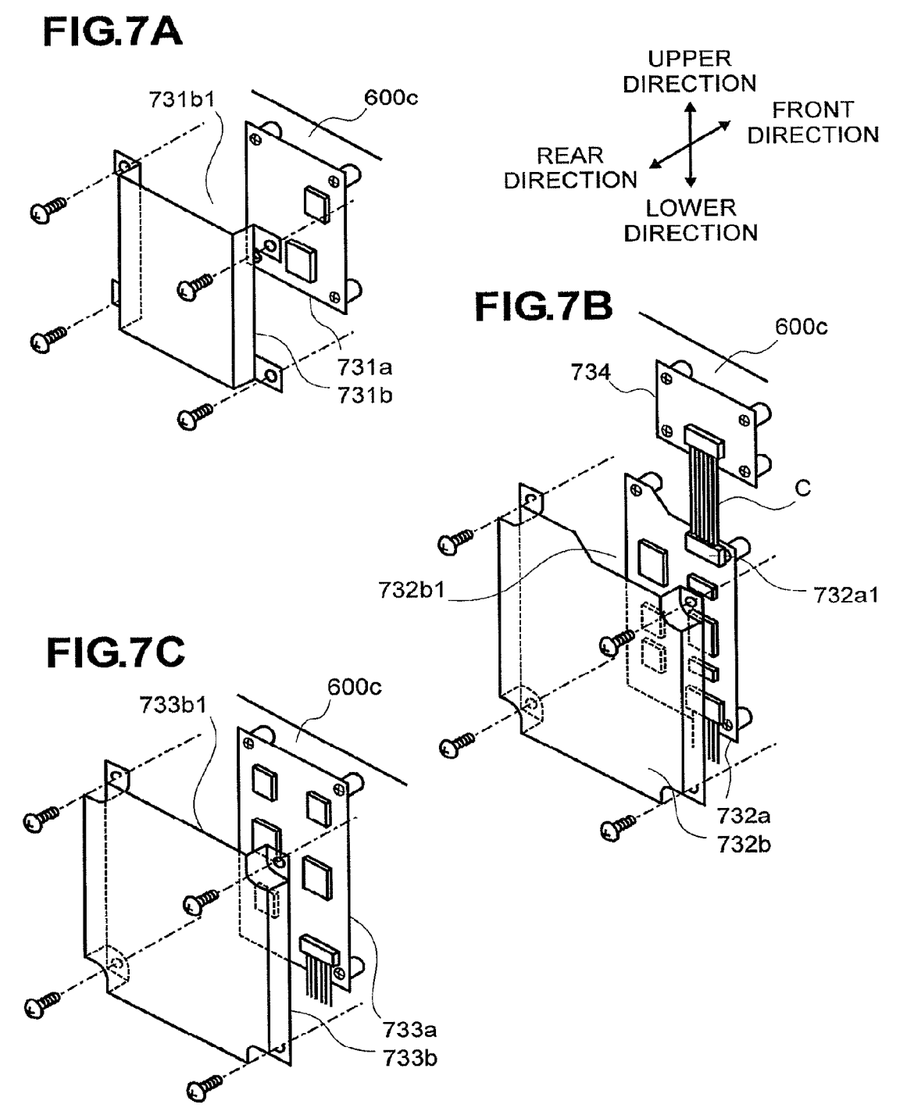
FIGS. 7A to 7C are drawings showing configurations of substrates provided on the back surface of the panel module according to this embodiment.

Referring now to FIGS. 7A to 7C, configurations of the substrates on the back surface (on a substrate disposition surface 611) of the panel module described with reference to FIG. 1 will be described.

FIG. 7A is an exploded view of the substrate 502 shown in FIG. 1. A substrate 731a is fixed to the back frame 600c using screws. Also, a case 731b for electromagnetic shielding is mounted on the back frame 600c in such a manner that the case 731b surrounds the substrate 731a. FIG. 7B is an exploded view of the substrate 501 (substrate 734) and the substrate 504 (substrate 732a). The substrates 734 and 732a are fixed to the back frame 600c using screws. No case is mounted on the substrate 734, while a metal case 732b is mounted on the substrate 732a. The metal case 732b also serves as electromagnetic shield for preventing outward leakage of electromagnetic radiation emitted by a circuit element implemented on the substrate. The substrates 734 and 732a are connected via a cable C and a connector 732a1. FIG. 7C is an exploded view of the power supply substrate 505 shown in FIG. 1. A substrate 733a is fixed to the back frame 600c using screws. Also, a case 733b is mounted on the back frame 600c in such a manner that the case 733b surrounds the substrate 733a.

High heat-generating components of the substrates 731a, 732a, and 733a are implemented on surfaces thereof opposed to the cases 731b, 732b, and 733b. A space 731b1, a space 732b1, and a space 733b1 lie between the cases 731b, 732b, and 733b and the corresponding implemented components. Here, the space 731b1, space 732b1, and space 733b1 between the upper surfaces of the substrates (surfaces opposed on the cases) and the corresponding cases are collectively referred to as a first space and the size of the first space is represented by H1.

Incidentally, due to slimming down of image display apparatuses, the size H1 of the first space tends to be reduced. As such, spaces between the back frame 600c and the lower surfaces (surfaces opposed to the back frame 600c) of the substrates 731a, 732a, and 733a tend to be reduced. Here, the spaces between the back frame 600c and the lower surfaces of the substrates are collectively referred to as a second space and the size of the second space is represented by H2. Also, due to upsizing of screens, a cooling passage for circulating cooling air tends to lengthened.

Figure 8:
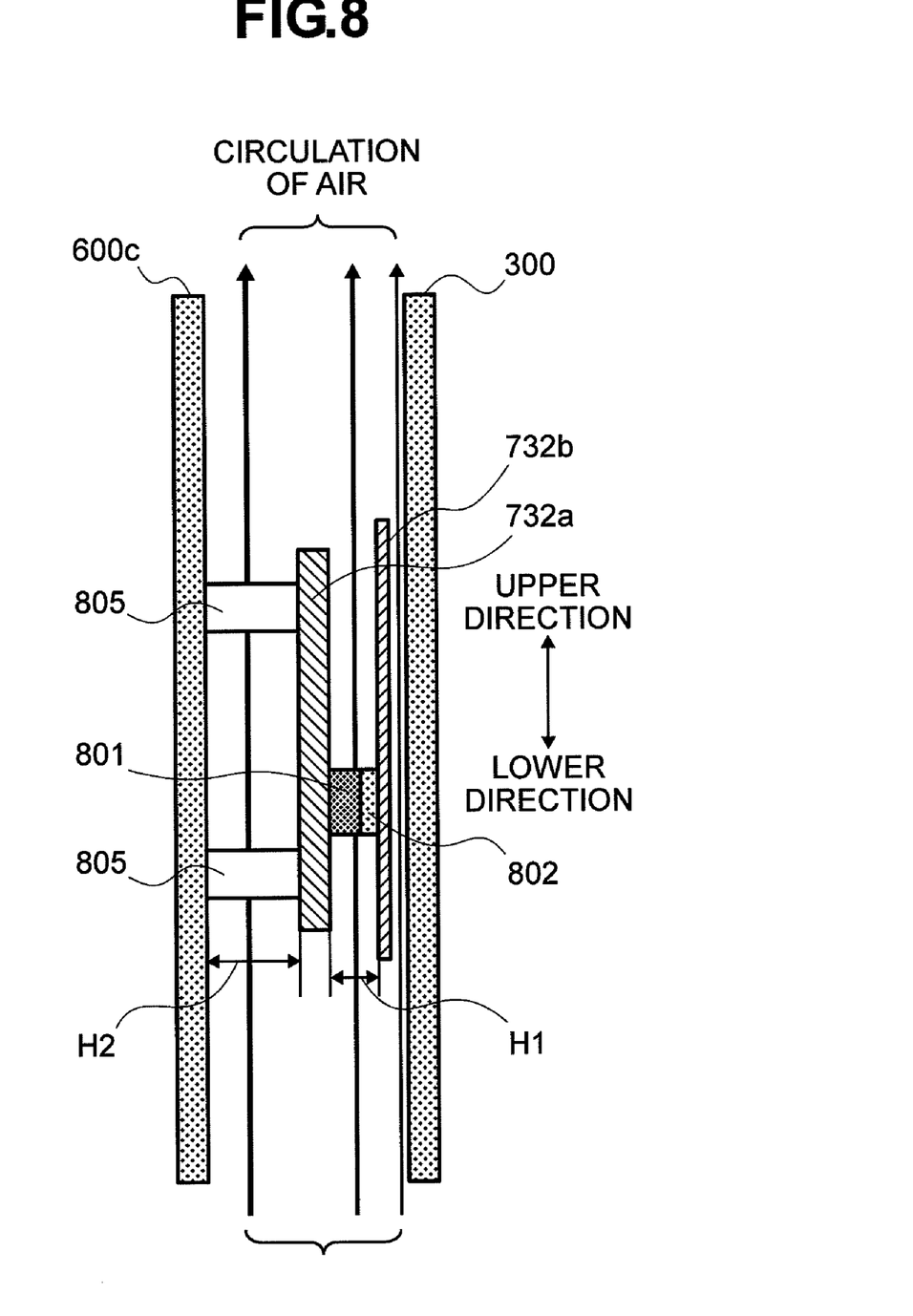
FIG. 8 is a drawing showing a cooling structure according to this embodiment.

In views of the foregoing, as shown in FIG. 8, the image display apparatus according to this embodiment has a cooling structure effective to slimming down of the apparatus and upsizing of the screen. FIG. 8 is a drawing showing a cooling structure according to this embodiment. Specifically, FIG. 8 is a sectional view of the substrate 732a and case 732b shown in FIG. 7 and the back frame 600c and a back cover 300, between which the substrate 732a and case 732b are interposed. Arrows show flows of air (passages).

In FIG. 8, the substrate 732a is coupled to the back frame (chassis) 600c of the panel module 100 and bosses 805 and supported thereby. Various circuit components including a high heat-generating (high temperature) component 801 such as a CPU or an image processing LSI are implemented on the substrate 732a. Among the circuit components on the substrate, the high heat-generating component 801 and case 732b are connected to each other directly or via a heat conducting member 802. In the example shown in FIG. 8, the case 732b and high heat component 801 are thermally connected via the heat conducting member 802. Here, the heat conducting member 802 is, for example, a sponge-shaped sheet including an elastic body and is formed of, for example, any one of a resin, a metal, and fibers, or a combination of these materials.

The thickness of the heat conducting member 802 is, for example, several millimeters or less.

As shown in FIG. 8, in this embodiment, air is circulated through each of the first and second spaces. A larger amount of air is circulated through the second space. Air is also circulated through a third space formed between the case and the inner surface of the back cover 300. The amount of air circulated through the third space is smaller than that of air circulated through the first space. Air to be circulated through these spaces (spaces) flows in from openings made in a lower portion of the back cover 300 to be described later.

Typically, the case 732b is made of a metal in order to reduce electromagnetic noise or protect the circuit components. Thus, heat generated by the high heat-generating component 801 is conducted to the metal and then diffused through the case 732b. Also, since air is apt to flow in areas on the substrate on which no components are implemented and areas thereon on which short components (with sizes relatively small in a direction orthogonal to the surface of the substrate) are implemented, the heat conducted to the case from the high heat-generating component is favorably cooled in these areas. Therefore, even if the space H1 between the substrate 732a and case 732b is not increased (in other words, even if the space H1 is reduced to approximately the same size as that of the tallest one among the components on the substrate), the high heat-generating component is favorably cooled. Also, the heat generated by the high heat-generating component 801 is diffused through the case 732b; therefore, the temperature of the back cover 300 is prevented from being increased locally.

Also, as described above, the third space of the order of, for example, 0.2 mm or less to 1 mm is formed between the case 732b and the inner wall surface of the back cover 300. Therefore, by circulating air through the space, the cooling effect is enhanced. Also, the temperature of the back cover 300 is prevented from being increased locally. As a result, the space between the case 732b and back cover 300 is minimized. Here, the size of the third space is made smaller than that of the first space and is therefore made the smallest one of the sizes of the first to third spaces.

Since the material of the heat conducting member 801 is softer than that of the high heat-generating component 801 and is apt to become deformed, the heat conducting member 801 can follow the deformation of the case 732b or substrate 732a due to vibration or a temperature variation. Therefore, by coupling the high heat component 801 and case 732b via the heat conduction component 802 rather than bringing these components into direct contact with each other, the degree of thermal contact between the deformed high heat-generating component 801 and case 732b is increased so that the cooling effect is increased.

Also, as shown in FIG. 8, air is circulated through the first space. Thus, the high heat-generating component 801 is cooled using both the heat transfer to the case 732b and the air-cooling so that the cooling effect is further increased.

Also, in order to reduce the outward radiation of electromagnetic noise from the components implemented on the substrate, the upper and lower edges of the case are sometimes blocked. This makes difficult to circulate air through the first space. However, in the example shown in FIG. 8, the heat generated by the high heat-generating component is transferred to the case directly or via the heat conducting member. Also, a sufficient amount of air is supplied to the second space. Therefore, even if air is not circuited through the first space, the high temperature component is sufficiently cooled.

In such an instance, cooling of the high heat-generating component and a reduction in electromagnetic noise are both achieved.

Also, in the example shown in FIG. 8, the second space between the back frame 600c of the panel module 100 and the substrate 732a is increased so that a sufficient air flow is secured. In this embodiment, in order to cool the high heat component 801 using the metal case 732b, the second space is sufficiently increased (that is, the second space is made larger than the first space) so that a larger amount of air flowing (that is, flowing from the back surface and/or a lower portion of the back cover 300) into the image display apparatus is distributed to the space between the back frame 600c and substrate 732a than to the space between the circuit substrate 732a and case 732b. In this embodiment, the second space is, for example, at least 3 mm or more. Since there are few implemented components on the back surface (surface opposed to the back frame 600c) of the substrate 732a and since a surface of the back frame 600c opposed to the substrate 732a is a plane with few bumps and dips, natural air flow is sufficiently secured in the second space. Also, since air is circulated through the second space, thermal interference between the back frame 600c and substrate 732a is reduced.

Figure 9:
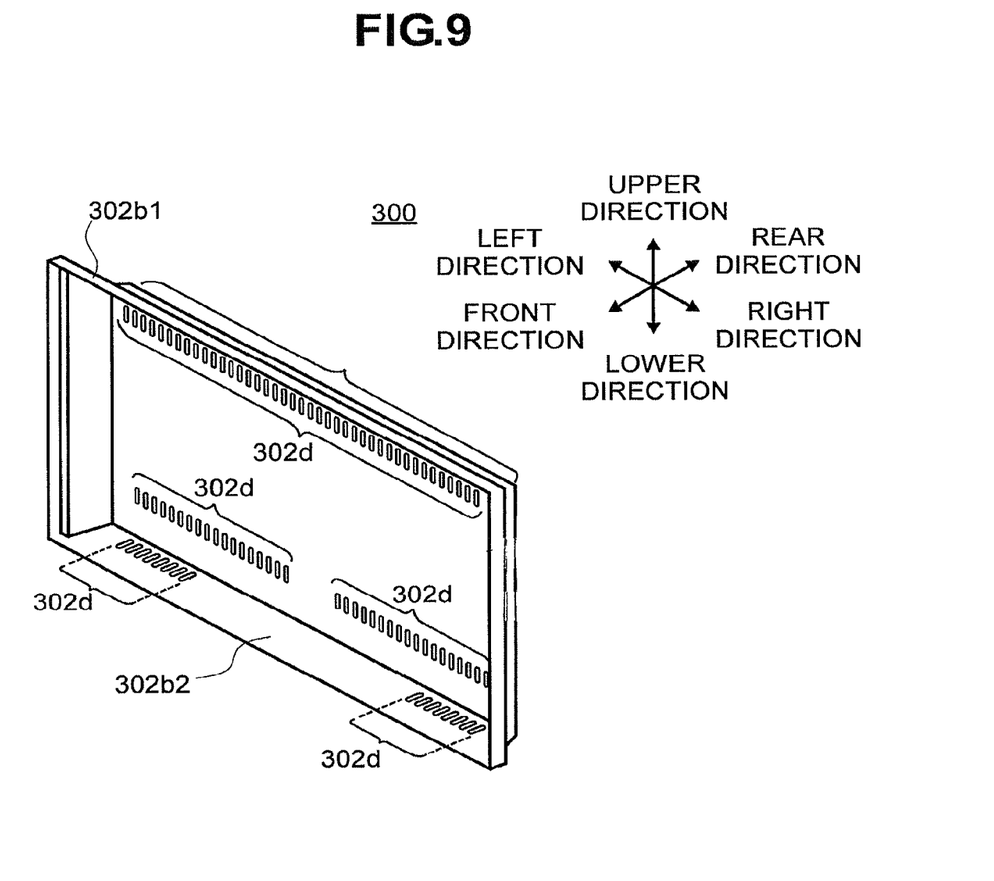
FIG. 9 is a drawing showing a back cover according to this embodiment.

FIG. 9 is a perspective view showing an overall configuration of the back cover 300 of the image display apparatus according to this embodiment. An upper surface 302b1 of the back cover 300 has multiple slit openings 302d and a portion of the back cover 300 immediately below the upper surface 302b1 also has multiple slit openings 302d. A lower surface 302b2 of the back cover 300 also has the multiple slit openings 302d and a portion of the back cover 300 immediately above the lower surface 302b2 also has two groups of multiple slit openings 302d.

The openings 302d made in the back cover 300 allow air to circulate through the first to third spaces shown in FIG. 8. That is, air flows into the apparatus from the openings 302d made in the lower portion of the back cover 300, absorbs heat inside the apparatus, and is exhausted from the openings 302d made in the upper portion of the back cover 300.

According to the above-described configuration, heat is exhausted from both the front and back surfaces of the substrate. Also, the sizes of the elements disposed on the back surface of the display unit, such as the circuit substrate, are reduced. Thus, both an increase in performance of the apparatus and slimming down thereof are achieved.

What is claimed is:

1. An image display apparatus including a panel module having a rectangular display panel, comprising:
   a strengthening unit provided on each of an upper edge and a lower edge of a back surface of the panel module in a vertical direction of the panel module, the strengthening unit extending in a horizontal direction of the panel module; and
   a plurality of supporting members mounted on the strengthening units, the supporting members extending in the vertical direction of the panel module;
   characterized in that:
   the panel module comprises an L-shaped member at each of the upper edge and the lower edge of the panel module; and
   each strengthening unit comprises a horizontally extending member having a U-shaped section, wherein the U-shaped section extends vertically from the L-shape member, while the U-shaped section extends horizontally with respect to the panel module in the vertical direction, the L-shaped members are positioned at the upper and lower edges of the panel module such that a part of the L-shaped member projects outwardly from the panel module, in the horizontal direction, and the U-shaped sections open in the horizontal direction, with the U-shaped sections receiving and being directly fixed to the projected part of a respective L-shaped member.

2. The image display apparatus according to claim 1, wherein the plurality of supporting members are not directly fixed to the panel module.

3. The image display apparatus according to claim 2, wherein the strengthening unit inserted into the L-shaped member is fixed to the L-shaped member by screwing the strengthening unit to the L-shaped member in one of an upward direction and a downward direction of the panel module.

4. The image display apparatus according to claim 1, wherein a stand mounting unit to be used when the image display apparatus is set up on a floor or a hoisting attachment mounting unit to be used when the image display apparatus is hung on a wall is connectable to the supporting members.

5. The image display apparatus according to claim 1, wherein a circuit substrate is mounted on the supporting members and on a back surface of the panel module.

6. The image display apparatus according to claim 5, wherein a heat-generating component provided on the circuit substrate is coupled to a metal case directly or via a heat conducting member.

7. The image display apparatus according to claim 6, wherein air is circulated through a first space between the circuit substrate and the metal case and a second space between the circuit substrate and the back surface of the panel module in such a manner that the air moves from a lower portion of the image display apparatus to an upper portion thereof.

8. The image display apparatus according to claim 7, wherein H2>H1 where H1 represents the first space and H2 represents the second space.

9. The image display apparatus according to claim 7, further comprising:
a back cover for covering a back surface of the image display apparatus, the back cover having an opening for circulating air in each of an upper portion of the back cover and a lower portion thereof,
wherein air to be circulated through the first and second spaces is put in from the opening formed in the lower portion of the back cover, circulated through the first and second spaces, and then exhausted from the opening formed in the upper portion thereof.

10. The image display apparatus according to claim 9, wherein air is also circulated through a third space between the back cover and the metal case, and
the second space is larger than the first space and the third space is smaller than the first space.

* * * * *